United States Patent [19]

Otomo et al.

[11] Patent Number: 4,894,098
[45] Date of Patent: Jan. 16, 1990

[54] PROCESS FOR PREPARING MAGNETIC LAYER AND MAGNETIC HEAD PREPARED USING THE SAME

[75] Inventors: Shigekazu Otomo, Sayama; Noriyuki Kumasaka, Ome; Ryo Imura, Tokorozawa; Ryo Suzuki, Hachioji; Yutaka Sugita, Tokorozawa, all of Japan

[73] Assignee: Hitachi, Ltd., Tokyo, Japan

[21] Appl. No.: 225,368

[22] Filed: Jul. 28, 1988

Related U.S. Application Data

[62] Division of Ser. No. 768,965, Aug. 23, 1985, Pat. No. 4,772,976.

[30] Foreign Application Priority Data

Aug. 27, 1984 [JP] Japan ............................ 59-176856
Dec. 14, 1984 [JP] Japan ............................ 59-262777

[51] Int. Cl.$^4$ .................................................. G11B 5/845
[52] U.S. Cl. ........................................ 148/122; 148/900
[58] Field of Search ............... 148/100, 121, 900, 4, 148/122; 204/192.2

[56] References Cited

U.S. PATENT DOCUMENTS 4,372,985  2/1983  Bailey ............................... 427/38
4,451,500  5/1984  Gerard et al. ...................... 427/38

FOREIGN PATENT DOCUMENTS 0012912  7/1980  European Pat. Off. .
0082526  6/1983  European Pat. Off. .
0107443  5/1984  European Pat. Off. .
0115842  8/1984  European Pat. Off. .
2553754  11/1975  Fed. Rep. of Germany .
2655572  12/1976  Fed. Rep. of Germany .
0080323  7/1978  Japan .............................. 148/121
0223933  12/1984  Japan .............................. 148/100
0095729  5/1985  Japan .............................. 148/121
0167122  8/1985  Japan .............................. 148/100

OTHER PUBLICATIONS

Appl. Physics Letters, *New Magenetic Material Having Ultrahigh Magnetic Moment*, vol. 20, No. 12, Jun. 15, 1972, Kim et al.
Solid State Physics vol. 7, No. 9, Sep. 1972, pp. 3–15.
Physica Status Solidi Nov. 16, 1983, pp. 212–222.
Soviet Inventions Illustrated, Section CH, Week 8349, Jan. 25, 1984, Derwent Publications, Ltd., London, L03, & SU 997 098.
Physica Status Solidi (a), vol. 80, No. 1, Nov. 16, 1983, Berlin, DE; B. Rauschenbach et al: "Formation of compounds by nitrogen ion implantation in iron," Abstract and page 214.

*Primary Examiner*—S. Kastler
*Attorney, Agent, or Firm*—Antonelli, Terry & Wands

[57] ABSTRACT

Ion implantation is conducted in a desired area(s) of the surface of a magnetic layer, and annealing of the layer is carried out to control the composition in that desired area(s). The control of the composition may be facilitated by applying a one-directional or rotating magnetic field during ion implantation. In preparing a magnetic head, a portion of a magnetic pole at least on one side thereof in close proximity to a magnetic recording medium is formed into an iron or iron-based magnetic alloy film, at least part of which is subjected to ion implantation and annealing.

18 Claims, 10 Drawing Sheets

PROCESS FOR PREPARING MAGNETIC LAYER AND MAGNETIC HEAD PREPARED USING THE SAME

This is a division of application Ser. No. 768,965, filed Aug. 23, 1985, now U.S. Pat. No. 4,772,976.

BACKGROUND OF THE INVENTION

The present invention relates to a process for preparing a magnetic layer, particularly a process for preparing a magnetic layer suitable for magnetic recording and useful for an improvement of storage characteristics.

Further, the present invention relates to a magnetic head, particularly a magnetic head using as part of a magnetic pole a magnetic material having an extremely high saturation induction Bs (Bs=$4\pi$Ms, wherein Ms is saturation magnetization) which is prepared according to the above-mentioned process.

A magnetic layer having a high saturation induction and a high permeability is suitable for improving recording characteristics in a magnetic recording device. For the purpose of obtaining this kind of magnetic layer, a layer (film) of a magnetic compound has heretofore been formed by a low vacuum deposition method, a gas atmosphere deposition method, a sputtering method, or the like as described in "Appl. Physics Lett." (Vol. 20, No. 12, P. 15 (1972)) or "Solid State Physics" (Vol. 7, No. 9 (1972)). However, these known thin film deposition technologies have a defect that they are so poor in reproducibility that they provide large lot-to-lot variation of recording characteristics between magnetic layers formed because of not only large scattering or variation of magnetic characteristics thereof but also a difficulty encountered in controlling ambient conditions, etc. during magnetic layer formation. Furthermore, since a magnetic compound is formed on a substrate in vacuo or in a gas atmosphere at once, no consideration has been given at all to the control of the composition and magnetic characteristics of the magnetic layer surface only in the desired areas.

The magnetic head will now be discussed as an instance of magnetic recording devices. The magnetic recording technique has been making a remarkable progress these years by virtue of development of magnetic tapes with high coercive force and high performance head materials for the above-mentioned tapes. Especially when a metal tape having a high coercive force is used, a remarkable increase in output and an increase in O/N (output to noise) ratio are attained in a high recording density area ranging from several $\mu$m to 1 $\mu$m in recording wave length. Thus a marked improvement in recording density is being attained in the fields of VTR, etc. where a high recording density is required. However, a magnetic head using ferrite which has heretofore been used in VTR, etc. does not have a sufficient recording magnetic field because the saturation induction of ferrite is about 5000 G or lower. Thus a magnetic head using a metal magnetic material having a high saturation induction has been demanded in using a metal tape with a high coercive force. Examples of such a metal magnetic material include an Fe-Al-Si alloy (saturation induction: about 10 kG), an Fe-Ni alloy (saturation induction: about 8 kG), an Fe-Si alloy (saturation induction: about 18 kG), systems of at least one of Fe, Co, and Ni containing B, C, N, Al, Si, P, etc. incorporated thereinto, and metal-metal amorphous alloy systems of at least one of Fe, Co, and Ni containing Y, Ti, Zr, Hf, Nb, Ta, etc. incorporated thereinto, of which an Fe-Si alloy having a Si content of about 6 wt. % is a material having the highest saturation induction of about 18 kG.

On the other hand, the gap length of the VTR magnetic head has become smaller and smaller these years for realizing high density magnetic recording. The conventional gap length of 0.5 $\mu$m has recently been reduced to 0.3 $\mu$m, which must be further reduced to 0.1 to 0.2 $\mu$m in the future. When the gap length is reduced as described above, the strength of a stray field from the head is markedly decreased. Further, the coercive force of the magnetic recording medium is being increased steadily these years for realizing high density magnetic recording. The coercive force, about 300 Oe, of the conventional oxide type magnetic tape has been increased to about 700 Oe. Even a tape having a coercive force of about 1,500 Oe is now produced as a result of recent development of a magnetic tape using a metal magnetic powder. When a magnetic head having a small gap length as mentioned above is used with a magnetic tape having such a very high coercive force, there arises a problem of insufficiency of the recording capacity in a long wavelength area. Thus a magnetic head material having as high a saturation induction as possible is needed. In the future, the coercive force of the magnetic recording medium will be further increased while the gap length of the magnetic head will be further reduced. In view of such a trend, a high saturation induction will be more and more required of the magnetic head material.

As regards the magnetic head for perpendicular magnetic recording which has recently been increasingly studied, the thickness of the main pole with which recording and playback are made on the perpendicular magnetic recording material must be extremely reduced for improving the recording density. Where the main pole is extremely thin, magnetic saturation is liable to occur at the tip of the magnetic pole in recording. When magnetic saturation occurs, there arises a problem of a difficulty in recording on the perpendicular magnetic recording medium. To solve such a problem, the saturation induction of the magnetic material used in the main pole must be increased as much as possible.

The same problem is involved in the conventional thin film head for longitudinal magnetic recording which is employed in computer memories and the like. More specifically, since the thin film head has a small cross-sectional area of the magnetic pole in close proximity to the functional gap, magnetic saturation is apt to occur. Accordingly, also in the thin film head, a magnetic head material having a high saturation induction is eagerly demanded.

SUMMARY OF THE INVENTION

An object of the present invention is to provide a process for preparing a magnetic layer with high reproducibility and with high controllability by eliminating scattering or variation in the magnetic characteristics of the magnetic layer which will occur in the aforementioned thin film formation. More particularly, an object of the present invention is to provide a novel process for preparing a magnetic layer which is adapted to an improvement in the recording characteristics by controlling the composition and magnetic characteristics of the magnetic layer surface only in the desired areas.

Another object of the present invention is to provide a magnetic head having a superior recording characteristics to those of the conventional one by forming a magnetic pole thereof from a magnetic material having a higher saturation induction than that of the conventional one.

In the conventional methods including the gas atmosphere deposition method, it is impossible to control the number of atoms in the magnetic layer formed. Accordingly, the magnetic characteristics of the magnetic layer formed show large variation (place-to-place in the same layer, and/or lot-to-lot) depending on a minute difference in an environment (degree of vacuumness, etc.).

The first feature of the present invention consists in controlling the composition and characteristics of the magnetic layer with precision and with high reproducibility by injecting a desired number of ions into the magnetic layer by ion implantation and thermally diffusing the ions by heat treatment to attain uniformity.

The second feature of the present invention consists in obtaining a magnetic head having superior recording characteristics to those of the conventional one by constituting that portion of a magnetic pole thereof at least on one side thereof which is adjacent to the magnetic recording medium with an iron or iron-based magnetic alloy film, in at least part of which an area containing at least one element selected from among nitrogen, carbon, and boron is formed by ion implantation to provide a higher saturation induction in the above-mentioned element-containing area than that of the conventional high saturation induction magnetic material.

It is known that, when thin iron film formation is made in an atmosphere containing nitrogen by vacuum deposition or sputtering, a film having a higher saturation induction than that of iron can be obtained if the conditions are adequate (see the aforementioned "Solid State Physics" Vol. 7, No. 9 (1972) pp. 483–495). However, in the preparation of a film having a high saturation induction according to this method, a troublesome operation of accurately controlling partial pressure of nitrogen in the atmosphere and the temperature of a sample is needed. If the conditions are outside the adequate ranges, the saturation induction is drastically reduced, thus presenting a problem.

According to the present invention, the above-mentioned problem is solved by injecting or incorporating nitrogen into an iron or iron-based magnetic alloy film by ion implantation. The ion implantation method has a merit that the nitrogen density of the above-mentioned film per unit area thereof can be easily controlled. Accordingly, a magnetic layer having a high saturation induction can be easily prepared. The same outcome can be obtained where carbon or boron is used instead of nitrogen.

Additionally stated, Phis. Status Solids, Vol. 80, No. 1, pp. 211–222 (1983) mentions an instance of injection of nitrogen into iron or an iron-based alloy by ion implantation. However, it makes no mention of any magnetic characteristics of a sample obtained.

Stated in more detail, in the magnetic head for perpendicular magnetic recording according to the present invention, at least one element selected from among nitrogen, carbon, and boron is injected or incorporated into a portion of the main pole adjacent to the surface facing a magnetic recording medium by ion implantation after formation of the main pole with a thin film of iron or an iron-based magnetic alloy to increase the saturation induction of the iron or the iron-based alloy in the portion subjected to the ion implantation. Thus a perpendicular magnetic recording magnetic head having far excellent recording characteristics can be obtained.

In the magnetic head for longitudinal magnetic recording according to the present invention, at least a portion of the magnetic head adjacent to the functional gap-forming face is constituted by an iron or iron-based magnetic alloy film, and at least one element selected from among nitrogen, carbon, and boron is injected or incorporated into the iron or iron-based magnetic alloy film constituting the functional gap-forming face of the magnetic head by ion implantation to increase the saturation induction of the iron or iron-based magnetic alloy in the portion subjected to ion implantation. Thus a longitudinal magnetic recording head having excellent recording characteristics can be obtained.

Another merit of the magnetic head for longitudinal magnetic recording according to the present invention is as follows. When a magnetic layer having a high saturation induction is deposited on the functional gap-forming surface of the magnetic head by vacuum deposition or sputtering, the interface between a magnetic substrate and the high saturation induction magnetic layer formed thereon is parallel with the gap face, whereby the contour effect appears. By contrast, when a magnetic layer having a high saturation induction is formed on the functional gap-forming face by ion implantation as in the present invention, the density of the implanted element is gradually varied in the direction of depth, and hence the saturation induction also is gradually varied in the same direction. Thus the contour effect advantageously is apt hardly to appear.

The same applies to a ring type head for perpendicular magnetic recording.

As described above, in accordance with the present invention, there is provided a magnetic head having far excellent recording characteristics.

As to the magnetic head of the present invention, in some cases a magnetic layer having a high saturation induction may be easy to obtain stably when the product subjected to ion implantation is heated at a temperature of 70° to 500° C. When the heating temperature is higher than 500° C., a phase having a high saturation induction may unfavorably be decomposed to decrease the saturation induction.

In general, a magnetic alloy containing an interstitial element such as nitrogen, carbon, or boron in addition to iron or an iron-based magnetic alloy is known to have a magnetic anisotropy induced by magnetic annealing. This is because the interstitial element atoms contained in the iron or the iron-based magnetic alloy moves toward positions where they reduce the energy in the direction of magnetization to stabilize the direction of magnetization. When such an induced magnetic anisotropy is large, the permeability is low. Thus, in some cases the induced magnetic anisotropy is not desirable for the magnetic head. However, in some cases provision of an adequate degree of induced magnetic anisotropy in a given direction may be useful for the characteristics of the magnetic head.

As described above, control of the degree and direction of the induced magnetic anisotropy is necessary for obtaining a magnetic head having excellent characteristics. The above-mentioned control of the induced magnetic anisotropy can be achieved by application of a magnetic field to a sample with heating. Additionally, in the present invention, the induced magnetic anisotropy can be controlled by applying a one-directional magnetic field or a rotating magnetic field to the inside of a sample during the course of ion implantation.

The thickness of the ion-implanted layer formed by ion implantation according to the present invention varies depending on the ion acceleration voltage. It is difficult for the ion-implanted layer to have a thickness above about 1 μm. Therefore, the following procedure may be taken for obtaining an ion-implanted layer having a thickness of more than about 1 μm. Specifically, a plurality of times of repetition is made of the steps of forming a thin film of iron or an iron-based magnetic alloy having a thickness of 1 μm or less and implanting ions into the film to form an ion-implanted layer. In this way, lamination of ion-implanted layers is made to obtain an ion-implanted layer having a thickness of more than about 1 μm. Further, improvements in magnetic characteristics such as coercive force and permeability may be made by interposing a ferromagnetic or non-magnetic intermediate layer(s) between respective ion-implanted layers as mentioned above or blocks each of a plurality of ion-implanted layers.

DETAILED DESCRIPTION OF THE PREFERRED EMBODIMENT

Figure 1:
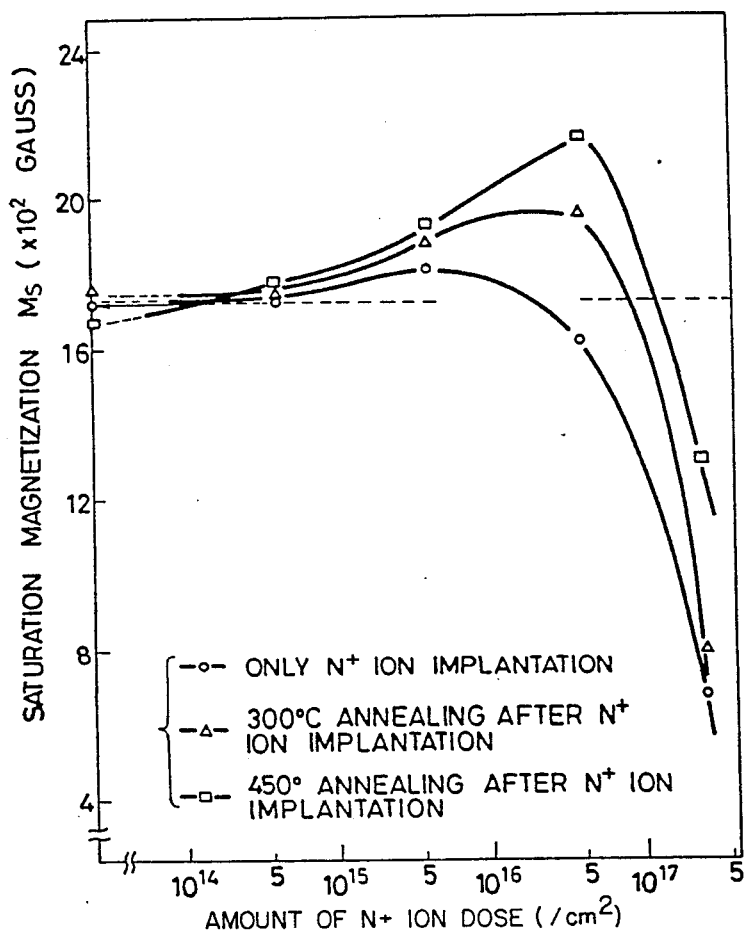
FIG. 1 is a diagram showing a relationship between the saturation magnetization Ms of the Fe film subjected to N+ ion implantation and the amount of N+ ion dose in one embodiment of this invention.

An embodiment of this invention will now be described with reference to FIG. 1. FIG. 1 shows a relationship between the saturation magnetization Ms and the amount of N+ ion dose (0 marks in the figure) and the dependency thereof on the annealing temperature (Δ and □ marks in the figure) in the case where N+ ions are implanted, at an acceleration voltage of 160 KeV, into an about 3,000 Å-thick Fe film prepared by known vacuum deposition or sputtering method, or other known methods. In the case of only ion implantation into the Fe film, the saturation magnetization of the ion-implanted layer is substantially the same as the value of the Fe bulk (∼1,720 G) up to a critical dose ($1 \times 10^{16}$ cm$^{-2}$) and then rapidly decreases to about 500 G at a dose of $2 \times 10^{17}$ cm$^{-2}$. On the other hand, when the N+ ion-implanted Fe film is subjected to heat treatment or annealing, for example, at 300° C. or 450° C., the saturation magnetization Ms temporarily increases to a far larger value than that of pure Fe (about 2,000 G at a dose of $5 \times 10^{16}$ cm$^{-2}$) and then decreases.

Figure 2:
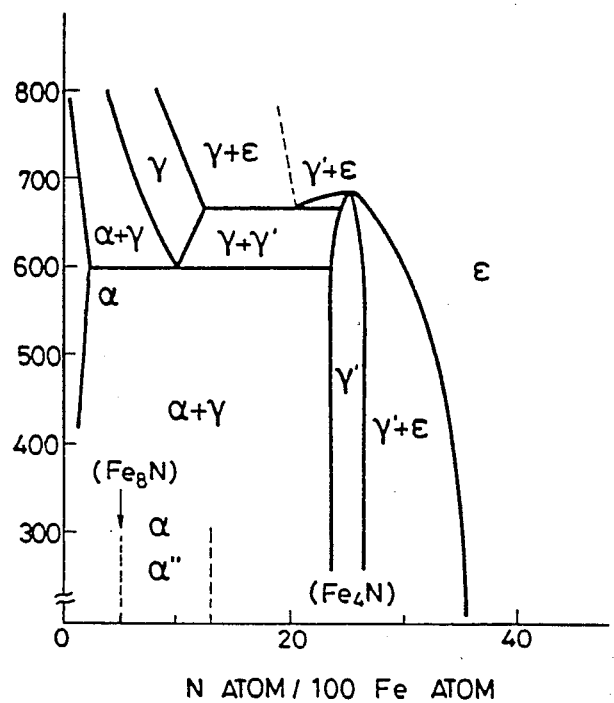
FIGS. 2 and 3 are an Fe-N phase diagram and a diagram showing a relationship between the saturation magnetization Ms of the Fe-N compound and the amount of N, respectively.
Figure 3:
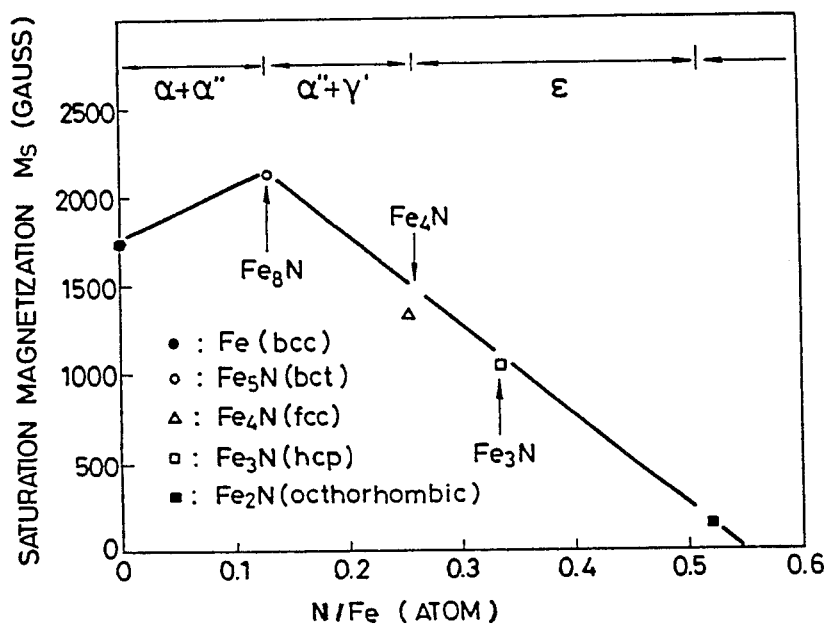

FIGS. 2 and 3 are an Fe-N phase diagram and a diagram showing a relationship between the saturation magnetization and the amount of N in nitrogen compounds of Fe (in a region of low N concentration). As shown in FIG. 3, in the nitrogen compounds of Fe, the saturation magnetization increases with a decreasing N concentration. It is known that the saturation magnetization of Fe$_8$N is far higher (about 2,200 G) than the value of pure Fe.

Figure 4:
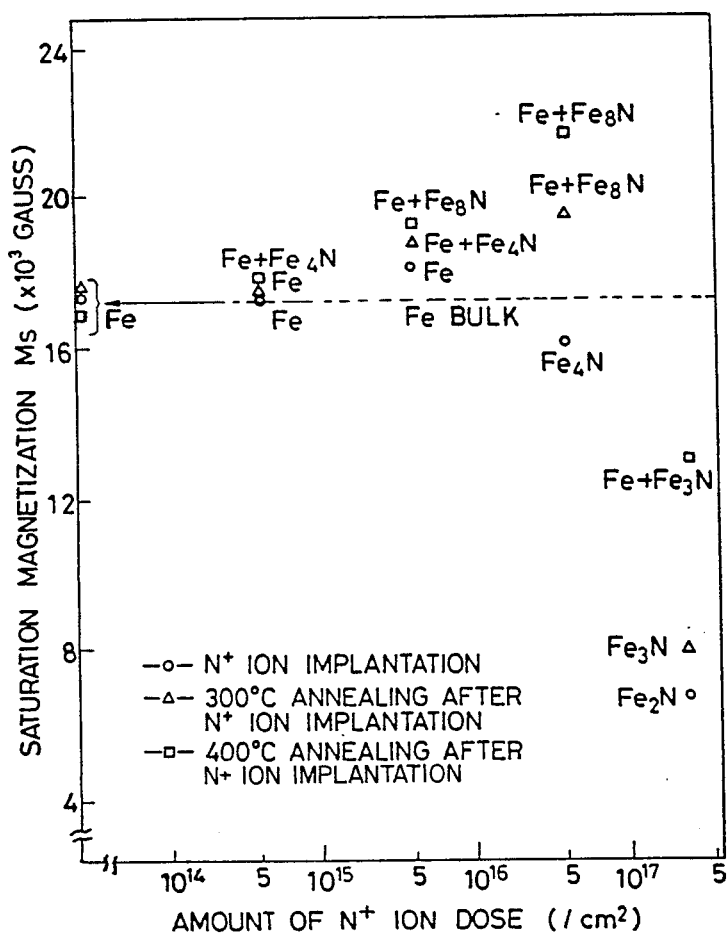
FIG. 4 is a diagram for illustrating changes in saturation magnetization Ms depending on the amount of N+ ion dose in the Fe film and the formation of N compounds.

FIG. 4 shows the dependency of nitrogen compounds of Fe present in the N+ ion-implanted Fe films, analyzed according to an X-ray diffraction measurement, on the amount of ion dose for explaining FIG. 1 concerning an embodiment of this invention. The saturation magnetization Ms of the N+ ion-implanted Fe film decreases with formation of Fe$_4$N, Fe$_3$N, and Fe$_2$N as the N+ ion dose increases in a range of $10^{16}$ to $10^{18}$ cm$^{-2}$. On the other hand, in the N+ ion-implanted Fe films subjected to heat treatment or annealing, with an increasing N+ ion dose, Fe$_8$N with a larger saturation magnetization than that of pure Fe appears at a N+ ion dose of about $5 \times 10^{16}$ cm$^{-2}$ and, subsequently, Fe$_4$N, Fe$_3$N, and Fe$_2$N appear with a decrease in the saturation magnetization Ms. Thus a film having a desired saturation induction Ms can be prepared with a nitrogen compound of Fe by specifying the N+ ion dose and the annealing temperature.

For example, when Fe$_8$N with a saturation magnetization Ms of 2,200 G is to be formed, a suitable N+ ion dose is $10^{16}$ to $10^{17}$ cm$^{-2}$ and a suitable annealing temperature is 300° to 500° C. When Fe$_3$N with a saturation magnetization Ms of about 1,000 G is to be formed, a suitable N+ ion dose is $10^{17}$ to $10^{18}$ cm$^{-2}$ and a suitable annealing temperature is about 300° to 400° C.

Figure 5:
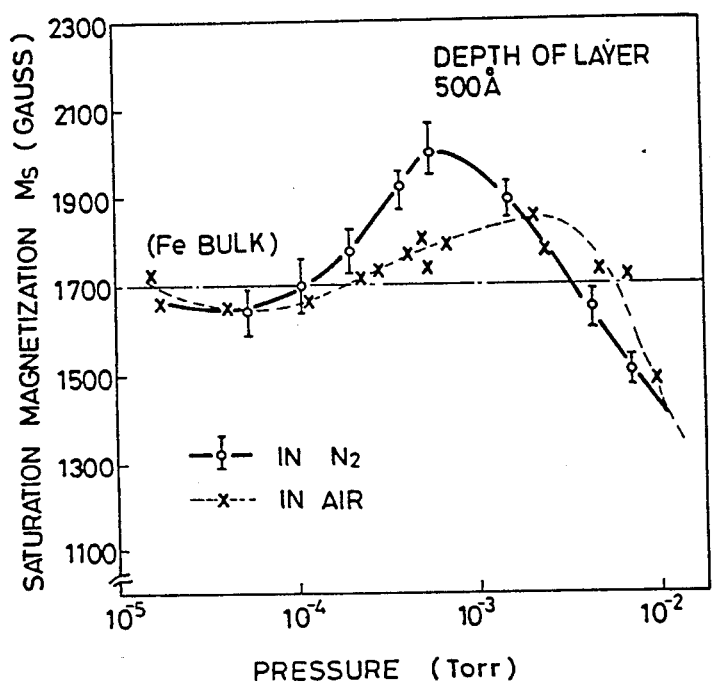
FIG. 5 is a diagram showing the saturation magnetization Ms of the Fe-N film prepared by a known environment control technique.

FIG. 5 shows a relationship between the saturation magnetization Ms of the Fe film prepared in an atmosphere of N$_2$ by a well-known sputtering method and the gas pressure. As shown by the dotted line in FIG. 5, the saturation magnetization Ms of the Fe film temporarily increases over the value of pure F by virtue of the presence of N even if the degree of vacuumness is decreased. In the films prepared in an atmosphere of N$_2$ as shown by the solid line, scattering of the saturation magnetization of the film is extremely large. Besides, it is known that the magnetic characteristics of the film prepared by this sort of method is extremely poor in reproducibility.

Figure 6A:
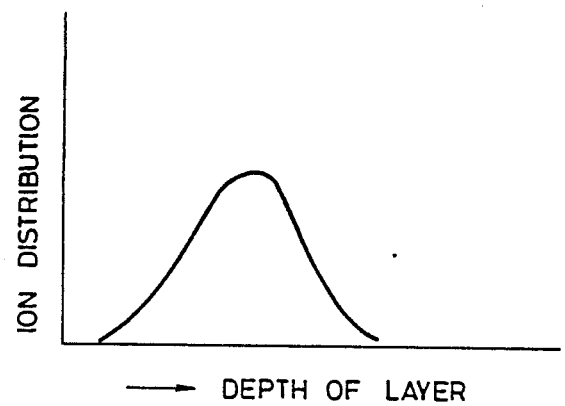
FIGS. 6(a) and (b) are diagrams each showing a depth of ion implantation and an ion distribution in ion implantation.
Figure 6B:
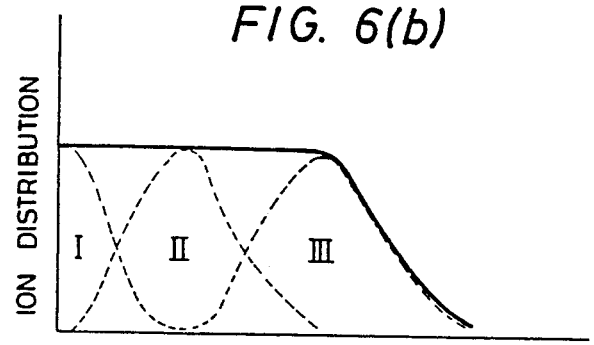

FIGS. 6(a) and (b) illustrate an embodiment of the present invention wherein a layer of a magnetic compound having a single composition is formed by multiple ion implantation. FIG. 6(a) shows an ion distribution, in the direction of depth, of a layer formed by single ion implantation. As heretofore known, this distribution constitutes a Gaussian distribution showing a concentration gradient. In this case, the composition distribution of the magnetic compound appears in the direction of thickness of the magnetic layer. On the other hand, according to the multiple ion implantation method as an embodiment of this invention, a layer of a magnetic compound having a single composition is formed when the acceleration voltage is so changed as to add Gaussian distributions (I+II+III). As a result, the magnetic characteristics of the compound layer (saturation magnetization, magnetic anisotropy, etc.) are rendered uniform in the direction of layer thickness.

Figure 7A:
FIGS. 7(a) and (b) are views illustrating preparation of a multi-layer magnetic layer by ion implantation.
Figure 7A:
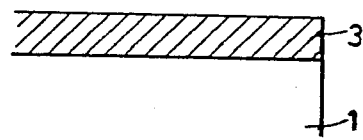
Figure 7B:
Figure 7B:
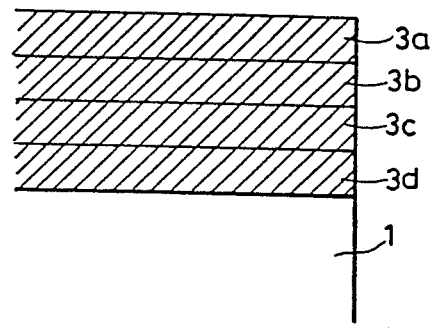

FIGS. 7(a) and (b) illustrate another embodiment of this invention. A magnetic layer 3 is formed through a step of magnetic layer deposition 1, a step of ion implantation 2, and a step of annealing as shown in FIG. 7(a). A thick layer of an ion-implanted magnetic compound having a multiple-layer structure 3a, 3b, 3c, and 3d is formed by repeating the above-mentioned steps as shown in FIG. 7(b). According to the current ion implantation technique, the depth of ion implantation is limited to at most several MeV due to the limitation of an accelerator. According to the multiple structure materialized in the present invention, however, a thick layer of a magnetic compound having a single composition and a desired thickness can be formed without being adversely affected by the limitation of the accelerator.

Figure 8:
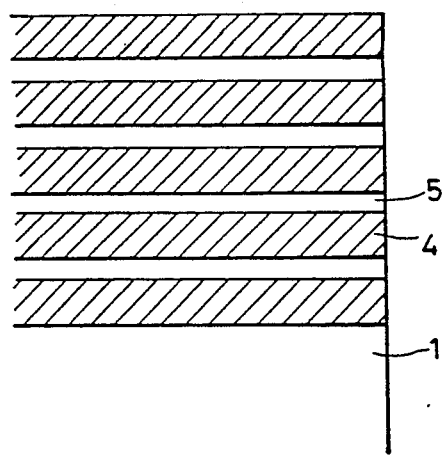
FIG. 8 is a view showing a laminate structure composed of magnetic layers and non-magnetic layers and prepared by ion implantation.

FIG. 8 shows a magnetic layer structure formed by alternately laminating ion-implanted magnetic compound layers 4 and non-magnetic layers 5 according to still another embodiment of this invention. In the usual magnetic layer, the magnetic characteristics such as coercive force and permeability are largely influenced by the layer thickness. When the laminate structure including non-magnetic layers according to this embodiment of this invention is adopted, a desired multi-layer structure layer of a magnetic compound keeping the desired magnetic characteristics inherent to a thin layer of that compound, as they are, can be obtained.

Figure 9A:
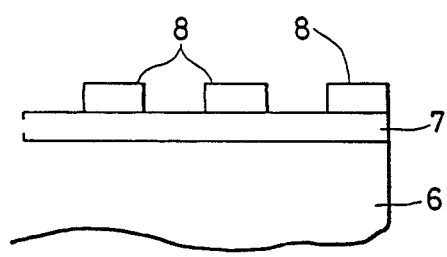
FIGS. 9(a) and (b) are diagrams showing a magnetic layer prepared by ion implantation through a mask in another embodiment of the present invention.
Figure 9B:
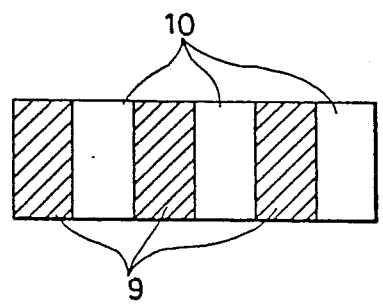

FIG. 9 shows a compound distribution of the surface of a magnetic layer in the case where ion implantation is made through a mask as an application embodiment of this invention. As shown in FIG. 9(a), a mask 8 is formed on the magnetic layer 7 prepared on a substrate 6. When ion implantation is made over the mask 8, a pattern consisting of ion-implanted magnetic layers 9 and magnetic layers 10 not subjected to ion implantation is formed as shown in FIG. 9(b).

According to the present invention, a desired layer of a magnetic compound can be formed with high reproducibility by directly specifying the number of atoms and the annealing temperature unlike the processes requiring a very delicate control of parameters such as an atmospheric parameter involving a degree of vacuumness or a gas pressure.

Although Fe-N compounds were described hereinabove, not only binary magnetic compounds such as Ni-N system, Co-Zr system, Fe-Tb system, Gd-Co system, Fe-B system, and Fe-Si system but also ternary magnetic compounds such as Fe-Mn-Si system can provide a magnetic layer having the same effects as hereinbefore described by ion implantation of a second element and a third element. Moreover, the saturation magnetization Ms, the anisotropic magnetic field Hk, the permeability $\mu$, and the like become controllable according to the present invention.

As described above, according to the present invention, control of a composition in desired areas can be easily made, and hence a layer of a magnetic compound can be selectively formed, for example, into a mosaic pattern besides a stripe pattern as shown in FIG. 9(b).

According to the present invention, a desired number of ions are injected into a magnetic layer by ion implantation as hereinbefore described, and thermally diffused by annealing to achieve uniformity for forming a desired layer of a magnetic compound. Thus, magnetic layers that may be utilized as magnetic bubble domain memory elements, magnetic heads, magnetic recording media, etc. can be formed with high reproducibility.

The following Examples will illustrate preparation of magnetic heads according to the foregoing process for preparing a magnetic layer with reference to FIGS. 10 to 13.

EXAMPLE 1

Figure 10:
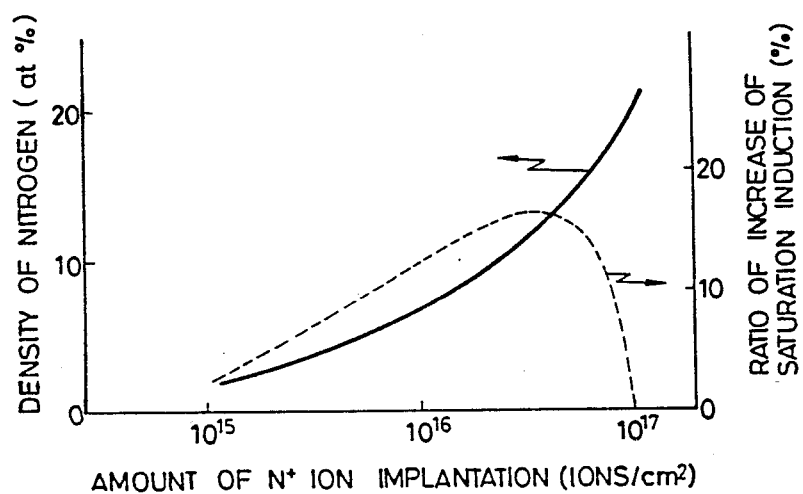
FIG. 10 is a diagram showing changes in the average N density in the Fe film and the ratio of increase of saturation induction against the amount of N+ ion implantation into the Fe film.

A thin iron film having a thickness of 0.15 $\mu$m was deposited on a glass substrate by sputtering. Subsequently, nitrogen ions are implanted into the above-mentioned thin iron film, and the substrate was annealed at 350° C. for 30 minutes. Changes in the average density of nitrogen and saturation induction of this iron film are shown in FIG. 10. As is apparent from FIG. 10, with an increase in the amount of N+ ion implantation, the average density of nitrogen in the iron film gradually increased, and the saturation induction increased by a maximum of about 15% at a dose of N+ ion implantation of about $5 \times 10^{16}$ ions/cm$^2$, namely at an average density of nitrogen of about 12 at. %. When the average density of nitrogen exceeded the above-mentioned value, the saturation induction rapidly decreased and fell to the same level as that of an iron film at an average density of nitrogen of 20 at. %. It will be understood from the above results that the saturation induction increases in a range of average density of nitrogen ranging from 0 at. %. to 20 at. % exclusive, favorably in a range of an average density of nitrogen ranging from 5 at. % to 18 at. %.

Figure 11A:
FIGS. 11(a) and (b) are rough illustrations of the process for preparing a perpendicular magnetic recording head as an embodiment of this invention.
Figure 11B:
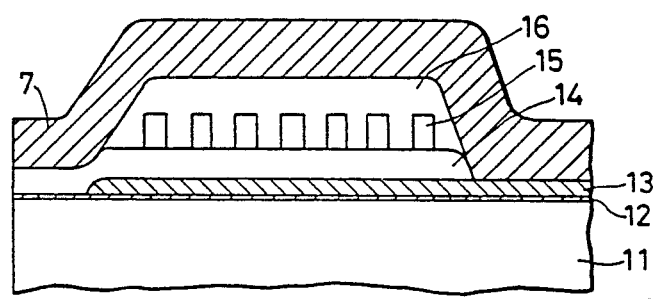
Figure 12:
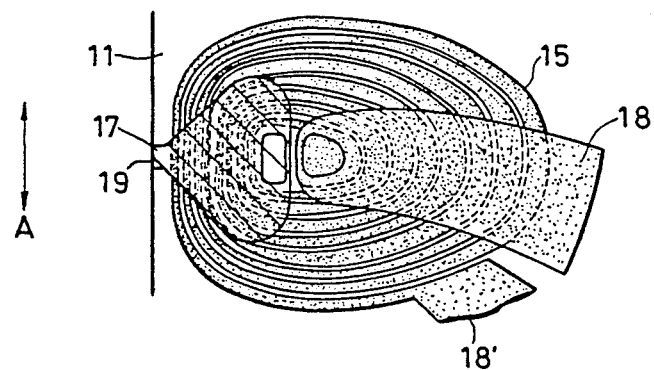
FIG. 12 is a plan view of the magnetic head as shown in FIGS. 11(a) and (b).

FIGS. 11(a) and (b) roughly illustrate a process for preparing a perpendicular magnetic recording head using as the main pole a magnetic layer having a high saturation induction as mentioned above. As shown in FIG. 11(a), a thin iron film 12 having a thickness of 0.15 $\mu$m was deposited as the main pole layer on a non-magnetic substrate 11 of Fotoceram (trade name of glass-ceramic products manufactured by Corning Glass Works, U.S.A.) by sputtering to form a pattern of a head having a tip portion of the magnetic pole with a width so narrowed as to provide a predetermined track width. Thereafter, a nitrogen ion implantation was made into the thin iron film 12 at a density of $5 \times 10^{16}$ ions/cm$^2$. Subsequently, the substrate was heated at 350° C. for 30 minutes to eliminate the strain caused by the ion implantation and at the same time to stabilize a phase showing a high saturation induction. Thus a main pole layer 12 having a high saturation induction was prepared. As shown in FIG. 11(b), a layer 13 of Permalloy for reducing the magnetic resistance of the main pole layer 12 was formed on the main pole layer 12, followed by patterning to remove part of the Permalloy layer 13 close to the tip of the main pole layer 12 by a width of about 2-5 $\mu$m. Subsequently, an insulating layer 14 of SiO$_2$ having a thickness of about 3 $\mu$m was formed all over by sputtering. An Al film was deposited on the layer 14 through a mask by vacuum deposition to form a spiral Al winding 15 having a width of 6 μm, a height of 4.0 μm, and a predetermined number of turns. Subsequently, a resin layer 16 was so coated as not only to fill up the gaps between the turns of the winding but also to cover the top surfaces, followed by curing thereof. An auxiliary pole 17 of a Co-W-Zr amorphous magnetic alloy film was formed on the layer 16. FIG. 12 shows a plan view of a perpendicular magnetic recording head thus prepared, wherein reference numeral 11 stands for a non-magnetic substrate, 17 for an auxiliary pole, 15 for a winding, 18 for a lead wire portion of the winding 15, and 19 for a surface facing a recording medium.

In recording on a Co-Cr perpendicular magnetic recording medium having a coercive force Hc of 1,000 Oe, use of the magnetic head prepared in this Example provided an increase of about 30% in recording density $D_{50}$ (recording density at which the playback output is half the output at a low recording density) over a magnetic head having a main pole not ion-implanted. As described above, it was confirmed that the magnetic head according to the present invention improved the recording density by virtue of the high saturation induction given by ion implantation to the main pole. The recording density-improving effect as in the case of nitrogen ion implantation was recognized in the case where either of carbon and boron ions were implanted, instead of nitrogen ions, into a main pole of iron or an iron-based magnetic alloy.

EXAMPLE 2

In a magnetic head having a thin magnetic layer as described in Example 1, it is important to control the magnetic anisotropy of the thin magnetic layer. In general, the thin magnetic layer has a tendency that the permeability in the direction perpendicular to the direction of easy magnetization is higher than that in the direction of easy magnetization. Therefore, it is preferred to have the direction perpendicular to the direction of magnetic flux coincide with the direction of easy magnetization in the constitution of the magnetic head. In preparing the magnetic head according to the present invention, the magnetic anisotropy of the main pole can be controlled by conducting ion implantation while applying the magnetic field. In this Example, ion implantation was carried out while applying a magnetic field of 50 Oe in the direction of the track width of the main pole, namely in the direction A shown in FIG. 12. The ion implantation conditions other than the magnetic field application were the same as in Example 1. Thereafter, a magnetic head for perpendicular magnetic recording was prepared in the same manner as in Example 1. Using the magnetic head, recording was made on a Co-Cr perpendicular magnetic recording medium as used in Example 1. The playback output at this time was higher by about 2 dB than that in the case of a magnetic head prepared without application of any magnetic field to the main pole layer during ion implantation. As described above, it was confirmed that an effect can be attained if the anisotropy of a main pole layer is controlled by applying a magnetic field in the step of ion implantation.

EXAMPLE 3

FIGS. 13(a) to (g) roughly illustrate a process for preparing a magnetic head consisting of Mn-Zn ferrite and a sputtered film of an iron-based magnetic alloy according to this invention, which is used as a magnetic head for longitudinal magnetic recording. The magnetic head of this Example has a structure described in Japanese Laid-Open Patent Publication No. 58-15513(1983).

Figure 13A:
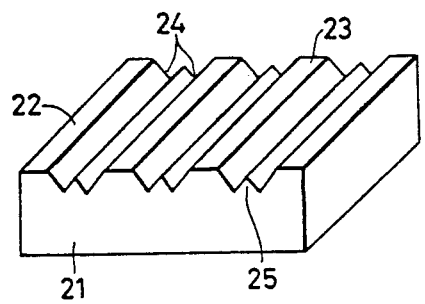
FIGS. 13(a) to (g) are rough illustrations of the process for preparing a longitudinal magnetic recording head as another embodiment of this invention.

As shown in FIG. 13(a), two Mn-Zn ferrite substrate 21 were prepared. A pair of contiguous V grooves 24 were formed by, for example, grinding, between every two flat portions 23 left at predetermined intervals on the surface 22 of one substrate which was supposed to be a gap confronting surface. In this case, the top of the inverse V protrusion 25 of the substrate 21 between every pair of the contiguous V grooves 24 was set to be lower by a predetermined length than the flat portions 23.

Figure 13B:
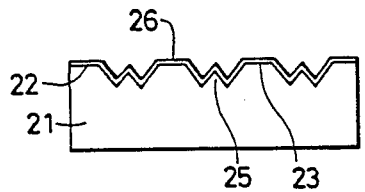

As shown in FIG. 13(b), an iron film 26 having a thickness of about 10 μm was formed by sputtering on the side 22 of the substrate 21 subjected to the groove-forming operation.

Figure 13C:
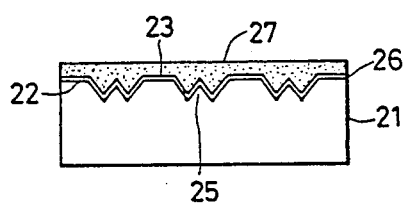

As shown in FIG. 13(c), a low melting point layer 27 is so melt-formed as to at least fill up the V grooves 24 on the iron film 26 deposited on the substrate 22.

Figure 13D:
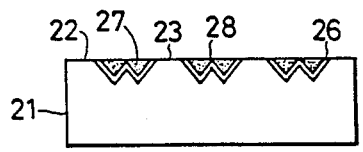

As shown in FIG. 13(d), the glass layer side of the substrate 21 with a glass layer 25 was ground and polished up to the height of the flat portions 23. At this time, the iron film 26 on the top of every inverse V protrusion 25 of the substrate 21 was partially ground and polished to become flat. Thus, planes 28 forming a functional gap and having a predetermined track width were obtained.

Figure 13E:
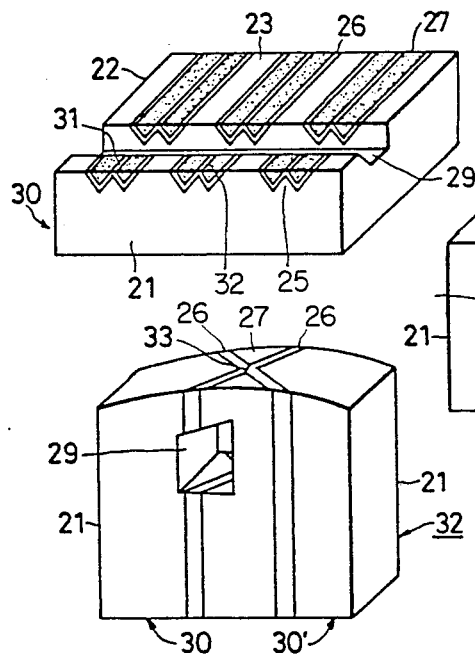

As shown in FIG. 13(e), a groove 29 for a winding window was formed by, for example, grinding, in the substrate 21 subjected to the step of FIG. 13(d) on the side thereof having the iron film 26 perpendicularly to the V grooves 24. Thus a block 30 of a half body of a magnetic head core was prepared. A substrate 21 as shown in FIG. 13(d) was prepared from another Mn-Zn ferrite substrate 21, and used as a block 30' of a half body of the magnetic head core. Subsequently, nitrogen ions were implanted into portions 31 of the iron film of the functional gap-forming planes 28 of the magnetic head core half-body block 30 on the side adjacent to the functional gap and the corresponding portions of the iron film of the magnetic head core half-body block 30' at a density of $5 \times 10^{16}$ ions/cm². Thereafter, a SiO₂ film having a thickness of 0.15 μm was deposited as the gap-forming layer by sputtering on the functional gap-forming plane of each of the magnetic head core half-body blocks 30 and 30'.

Figure 13F:
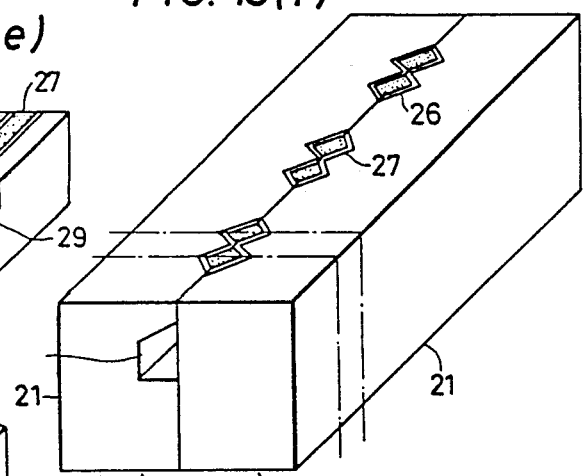
Figure 13G:
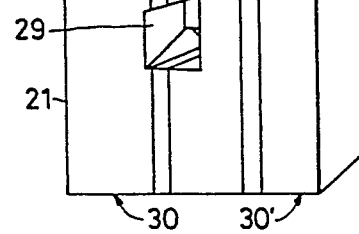

As shown in FIG. 13(f), the magnetic head core half-body blocks 30 and 30' subjected to the step of FIG. 13(e) were abutted against each other through the gap-forming layers with the ion-implanted portions of the iron film being confronted with each other, and heated at 380° C. for 30 minutes to melt the glass layers 27 for bonding the same. Thus the magnetic head core half-body blocks 30 and 30' were bonded with each other to effect integration. This heating also was intended to strengthen the bonding of nitrogen implanted into the iron film with iron for stabilizing the magnetic layer having a high saturation induction. Subsequently, a magnetic head 32 as shown in FIG. 13(g) was obtained by cutting the integrated magnetic head core half-body blocks 30 and 30' along dot-dash lines. The head 32 included the functional gap 33.

For comparison, a magnetic head as shown in FIG. 13(g) was prepared in substantially the same manner as described above except that ion implantation was not made into a magnetic head core half-body block 30 having a groove 27 for a winding window as shown in FIG. 13(e) and a magnetic head core half-body block 30' having no groove for a winding window. Using each of these magnetic heads, a signal of 5.8 μm in wavelength was recorded on a metal tape having a coercive force Hc of 1,500 Oe. When the signal was played back using a conventional ferrite magnetic head, it was recognized that the magnetic head prepared by involving the step of ion implantation provided an output increase of about 1.5 dB over the magnetic head prepared without the step of ion implantation. Such a recording characteristics-improving effect also could be obtained in the case where carbon or boron ion implantation was conducted in place of nitrogen ion implantation.

As hereinbefore described, introduction of at least one element selected from among nitrogen, carbon, and boron by ion implantation into the main pole film in a portion thereof in close proximity with the surface facing a magnetic recording medium in the case of a magnetic head for perpendicular magnetic recording, and into iron or an iron-based alloy, used on the side of the functional gap-forming plane, at least in a portion thereof in close proximity to the functional gap in the case of a magnetic head for longitudinal magnetic recording served to improve the saturation induction of the iron or iron-based alloy to provide a magnetic head having far excellent recording characteristics.

What is claimed is:

1. A process for preparing a magnetic layer comprising the steps of implanting ions into the surface region of a thin transition element-based magnetic film, and annealing said film to form an ion-diffused layer to thereby control the composition of said surface region for forming a desired magnetic compound layer.

2. A process for preparing a magnetic layer as claimed in claim 1, wherein said ions are implanted by multiple ion implantation while changing ion acceleration voltages to provide a single composition for said desired magnetic compound layer.

3. A process for preparing a magnetic layer as claimed in claim 1, wherein said transition element mainly constituting said thin transition element-based magnetic film comprises Fe, Co, and Ni.

4. A process for preparing a magnetic layer as claimed in claim 1, wherein said magnetic layer is provided with a multi-layer structure having a desired magnetic compound layer(s) formed through the steps of ion implantation and annealing and a non-magnetic layer(s).

5. A process for preparing a magnetic layer as claimed in claim 1, wherein said steps of ion implanatation and annealing are repeated after deposition of said thin transition element-based magnetic film to provide a multilayer structure for said desired magnetic compound layer.

6. A process for preparing a magnetic layer as claimed in claim 2, wherein said steps of ion implanatation and annealing are repeated after deposition of said thin transition element-based magnetic film to provide a multilayer structure for said desired magnetic compound layer.

7. A process for preparing a magnetic layer as claimed in claim 1, wherein said thin transition element-based magnetic film is an iron or iron-based alloy film and the step of implanting ions comprises implanting ions of at least one element selected from the group consisting of nitrogen, carbon and boron into said surface region of said thin transition element-based magnetic film so as to provide said thin transition element-based magnetic film with a higher saturation magnetization.

8. A process for preparing a magnetic layer as claimed in claim 7, wherein the step of implanting ions comprises implanting said ions at a dose such that an average density of said at least one element in said thin transition element-based magnetic film is 0–20 atom % exclusive.

9. A process for preparing a magnetic layer as claimed in claim 8, wherein said average density is in the range of 5–18 atom %.

10. A process for preparing a magnetic layer as claimed in claim 1, wherein the step of implanting ions is conducted while applying a one-directional magnetic field inside said thin transition element-based magnetic film.

11. A process for preparing a magnetic layer as claimed in claim 1, wherein the step of implanting ions is conducted while applying a magnetic field rotating relative to said thin transition element-based magnetic film inside said thin transition element-based magnetic film.

12. A process for preparing a magnetic layer as claimed in claim 1, wherein the step of annealing is conducted while applying a one-directional magnetic field inside said thin transition element-based magnetic film.

13. A process for preparing a magnetic layer as claimed in claim 1, wherein the step of annealing is conducted while applying a magnetic field rotating relative to said thin transition element-based magnetic film inside said thin transition element-based magnetic film.

14. A process for preparing a magnetic layer as claimed in claim 1, wherein the step of annealing is conducted at a temperature of 500° C. or lower.

15. A process for preparing a magnetic layer as claimed in claim 14, wherein the step of annealing is conducted at a temperature of 70°–500° C.

16. A process for preparing a magnetic layer as claimed in claim 1, wherein said thin transition element-based magnetic film is a Fe film and the step of implanting ions comprises implanting $N^+$ ions at a dose of $10^{16}$ to $10^{17}$ cm$^{-2}$, and the step of annealing comprises heating said thin transition element-based magnetic film to a temperature in the range of 300°–500° C.

17. A process for preparing a magnetic layer as claimed in claim 1, wherein the step of implanting ions comprises implanting ions into only selected spaced areas of the surface of said thin transition element-based magnetic film.

18. A process for preparing a magnetic layer as claimed in claim 17, further comprising forming a mask on portions of the surface of said thin transition element-based magnetic film to leave selected spaced areas of the surface of said thin transition element-based magnetic film exposed, wherein the step of implanting ions is conducted while said mask is on said surface of said thin transition element-based magnetic film.

* * * * *